United States Patent
Lehtola et al.

(10) Patent No.: US 6,431,343 B1
(45) Date of Patent: Aug. 13, 2002

(54) INTAKE DEVICE OF AN AUTOMATED REDEMPTION MACHINE FOR RETURNABLE CONTAINERS SUCH AS BOTTLES, CANS AND THE LIKE

(75) Inventors: Raimo Lehtola; Mika Hautamäki, both of Kouvola (FI)

(73) Assignee: Bevesys Oy, Kouvola (FI)

( * ) Notice: Subject to any disclaimer, the term of this patent is extended or adjusted under 35 U.S.C. 154(b) by 0 days.

(21) Appl. No.: 09/586,984

(22) Filed: Jun. 5, 2000

(30) Foreign Application Priority Data

Aug. 13, 1999 (FI) .................................... 991724

(51) Int. Cl.[7] .............................................. B65G 47/24
(52) U.S. Cl. ........................ 198/413; 198/395; 198/785
(58) Field of Search .................... 198/413, 395, 198/785

(56) References Cited

U.S. PATENT DOCUMENTS

| | | | |
|---|---|---|---|
| 1,863,520 A | * 6/1932 | Camerota | 198/785 |
| 4,029,196 A | * 6/1977 | Ekholm | 198/413 |
| 4,433,785 A | 2/1984 | Riggs et al. | |
| 4,533,033 A | * 8/1985 | Van Wegen | 198/413 |
| 4,832,173 A | * 5/1989 | Hattori et al. | 198/413 X |
| 6,170,637 B1 | * 1/2001 | Ishii | 198/785 X |

* cited by examiner

*Primary Examiner*—Stephen T. Gordon
*Assistant Examiner*—Lori L Coletta
(74) *Attorney, Agent, or Firm*—Browdy and Neimark

(57) ABSTRACT

An intake device of an automated redemption machine is disclosed for returnable containers, the intake device comprising half-conveyors for transporting the container in an essentially horizontal position and rotator assemblies for rotating the container for the purpose of scanning, a bar code. The invention is implemented so that the half-conveyors have slots adapted thereto transverse to the conveyor travel direction, the slots permitting at least partially elevating and lowering the rotator discs via the slots for rotating the returned containers.

5 Claims, 4 Drawing Sheets

INTAKE DEVICE OF AN AUTOMATED REDEMPTION MACHINE FOR RETURNABLE CONTAINERS SUCH AS BOTTLES, CANS AND THE LIKE

BACKGROUND OF THE INVENTION

1. Technical Field of the Invention

The present invention relates to an intake device of an automated redemption machine for returnable containers such as bottles, cans and the like, said intake device comprising a conveyor for transporting the container in an essentially horizontal position and means for rotating the container for the purpose of scanning, e.g., a bar code.

2. Prior Art

In recent times, there has been a general adoption of automated redemption machines of the kind discussed herein having a construction into which bottles, cans and the like containers are returned bottom first in an essentially horizontal position. One embodiment of such a machine is known from publication WO 9802255. A benefit obviously gained by the horizontal intake position over traditional intake with the container standing in the upright position is that the container cannot topple when being placed onto the intake conveyor. Particularly, plastic bottles that are widely used today are so light when empty that they are very difficult to keep upright. A toppled container in most cases causes a malfunction of the automated redemption machine or the customer may remain short of the refund. Moreover, modern automated redemption machines are expected to fulfill extremely tough requirements in regard to the automated machine's capability of identifying and handling containers of most varied character. Herein, the term container must be understood to refer to all kinds of empty returnable containers including glass and plastic bottles and cans. The size and weight of these containers may vary in very large limits. For instance, the intake device may have to handle in succession a bottle having a bottom diameter of about 15 cm and a weight in excess of 1 kg followed by an extremely small minibar-size bottle typically used for alcoholic beverages. This situation puts the intake device and the identification system connected thereto under stringent demands.

In conventional horizontal-intake redemption machines, the intake device generally comprises two parallel, horizontally moving belts driven by rollers or the like elements. Obviously, the belts are spanned in the travel direction of the conveyor, and their surfaces may be inclined at a small angle relative to each other so that the container being returned is supported on its sides to both of the belts. Furthermore, the prior-art container intake device includes a rotating means serving to rotate the container about its longitudinal axis so that a bar code reader can detect the bar code printed on the container. As the transport belts of the intake device have a solid and broad surface, it is obvious that the rotating means cannot be arranged to operate through them, but instead, the rotating means is implemented as a transverse rotating element adapted to operate in the gap remaining between the belts.

OBJECT AND SUMMARY OF THE INVENTION

It is an object of the present invention to provide a novel type of intake device for an automated redemption machine, the device facilitating the operation of container rotating means through the container transport means. An intake device according to the invention is characterized in that the conveyor means have slots adapted thereto transverse to the conveyor travel direction, said slots permitting at least partially elevating and lowering via said slots the means for rotating the returned containers.

A preferred embodiment of the intake device according to the invention is characterized in that the conveyor means comprises a plural succession of intake transport elements aligned essentially transverse to the conveyor travel direction, whereby said transverse slots are formed by the gaps remaining between said transport elements.

Another preferred embodiment of the intake device according to the invention is characterized in that said intake transport elements are arranged to comprise two adjacent half-conveyors with their essentially planar surfaces tilted in respect to each other so as to form an essentially V-shaped conveyor on which a container being transported is supported by its sides to both of the half-conveyors.

A still another preferred embodiment of the intake device according to the invention is characterized in that said intake elements are transport rollers or rolls rotated by a common or separate drive means, whereby the half-conveyors are comprised of roller/roll sets of successive rollers or rolls.

A still another preferred embodiment of the intake device according to the invention is characterized in that the roller/roll sets have at least one section in which the container intake rollers/rolls are rotatable independently from the other conveyor sections.

A still another preferred embodiment of the intake device according to the invention is characterized in that the means for rotating the container comprise rotator assemblies adapted beneath both of the half-conveyors, at least over a portion of the conveyor travel, and that both of the rotator assemblies comprise a plurality of axially aligned rotating discs having their principal plane aligned parallel to the longitudinal axis of the intake conveyor rollers/rolls, said discs being arranged to coincide with the conveyor slots that are situated transverse to the conveyor travel direction, and that said rotator assemblies are equipped with an actuator for elevating and lowering said rotating discs in said slots respectively up and down.

The container intake device according to the invention features an extremely uncomplicated construction and secure operation. Furthermore, the device is cost-efficient to manufacture and facilitates safe handling of all types of returnable containers.

BRIEF DESCRIPTION OF THE DRAWINGS

In the following, the invention will be described in greater detail by making reference to the appended drawings in which.

DETAILED DESCRIPTION OF THE PREFERRED EMBODIMENT(S) OF THE INVENTION

Figure 1:
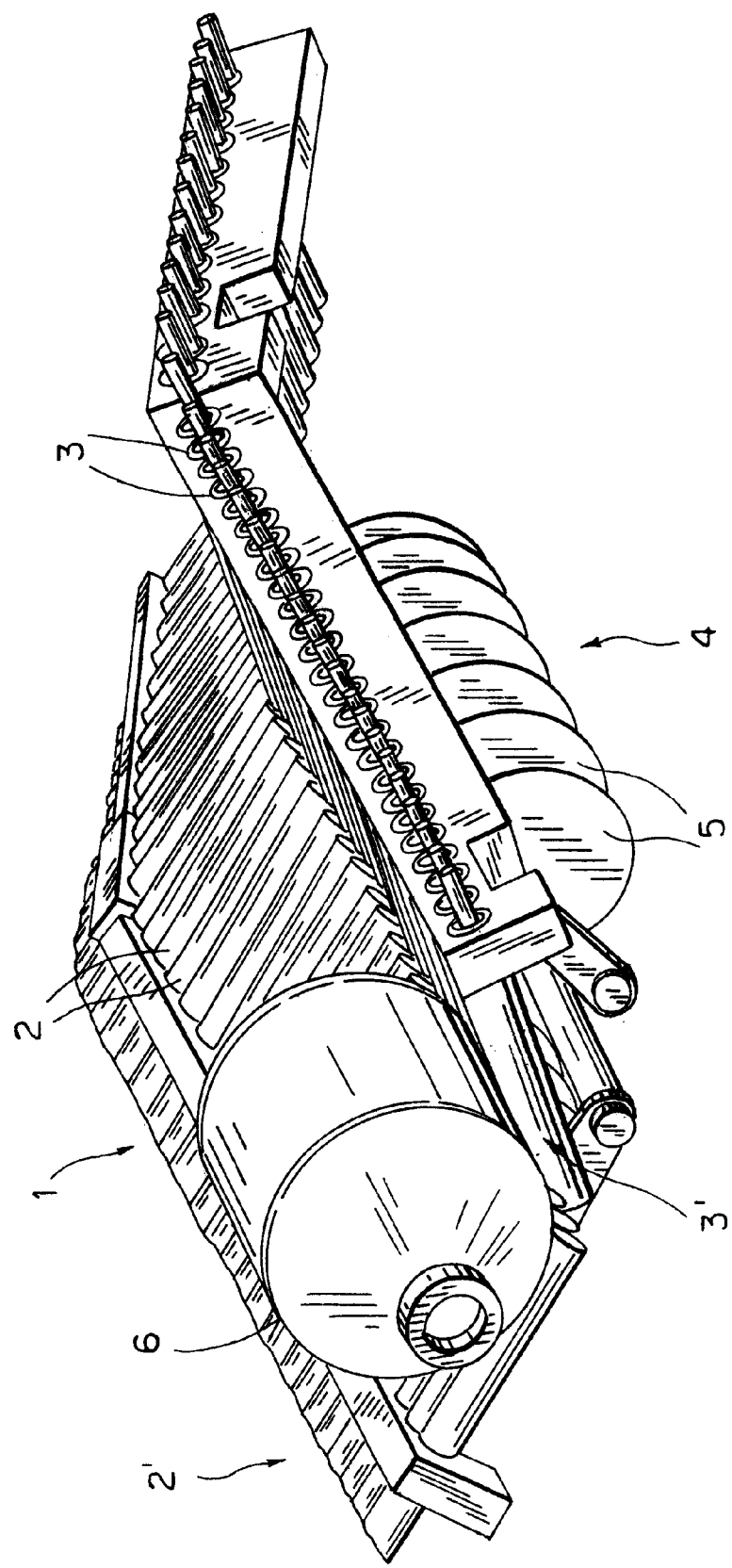
FIGS. 1–4 show a container intake device according to the invention and its different steps of its operating sequence.

In the diagrams, an intake device according to the invention which is generally designated by reference numeral 1 is comprised of two half-conveyors 2', 3'. The conveyor proper consists of two mutually essentially identical half-conveyors 2' and 3' that may be tilted so as to form an essentially V-shaped angle therebetween as can be seen from the diagrams. One half-conveyor is formed by intake transport elements 2 and the other half-conveyor is formed by intake transport elements 3. In the embodiment illustrated in the drawings, the intake transport elements 2, 3 are aligned essentially transverse to the conveyor travel direction and hence there are provided slots between the successive transport elements. The transport elements may be, e.g., driven conveyor rolls that are rotated by means of a suitable mechanism and an actuator not described in detail herein as the construction of such elements is well known to those skilled in the art. The intake device may also be designed about a belt conveyor or other type of caterpillar conveyor having transverse slots arranged thereon. The half-conveyors may comprise one section or a greater number of sections, whereby the intake transport elements of one section can be driven, e.g., rotatingly, independently from the other sections.

Rotator assemblies 4 are adapted beneath both of the half-conveyors, at least over a portion of the conveyor travel. Both of the rotator assemblies are comprised of a plurality of axially aligned rotating discs 5 having their principal plane aligned parallel to the longitudinal axis of the intake conveyor slots, whereby said discs are aligned to coincide with the conveyor slots. The rotator assemblies 4 are equipped with an actuator for elevating and lowering said rotating discs 5 at least partially through said slots. Also the construction of such an actuator is well known to those skilled in the art on the basis of the operating principle described below.

Figure 2:
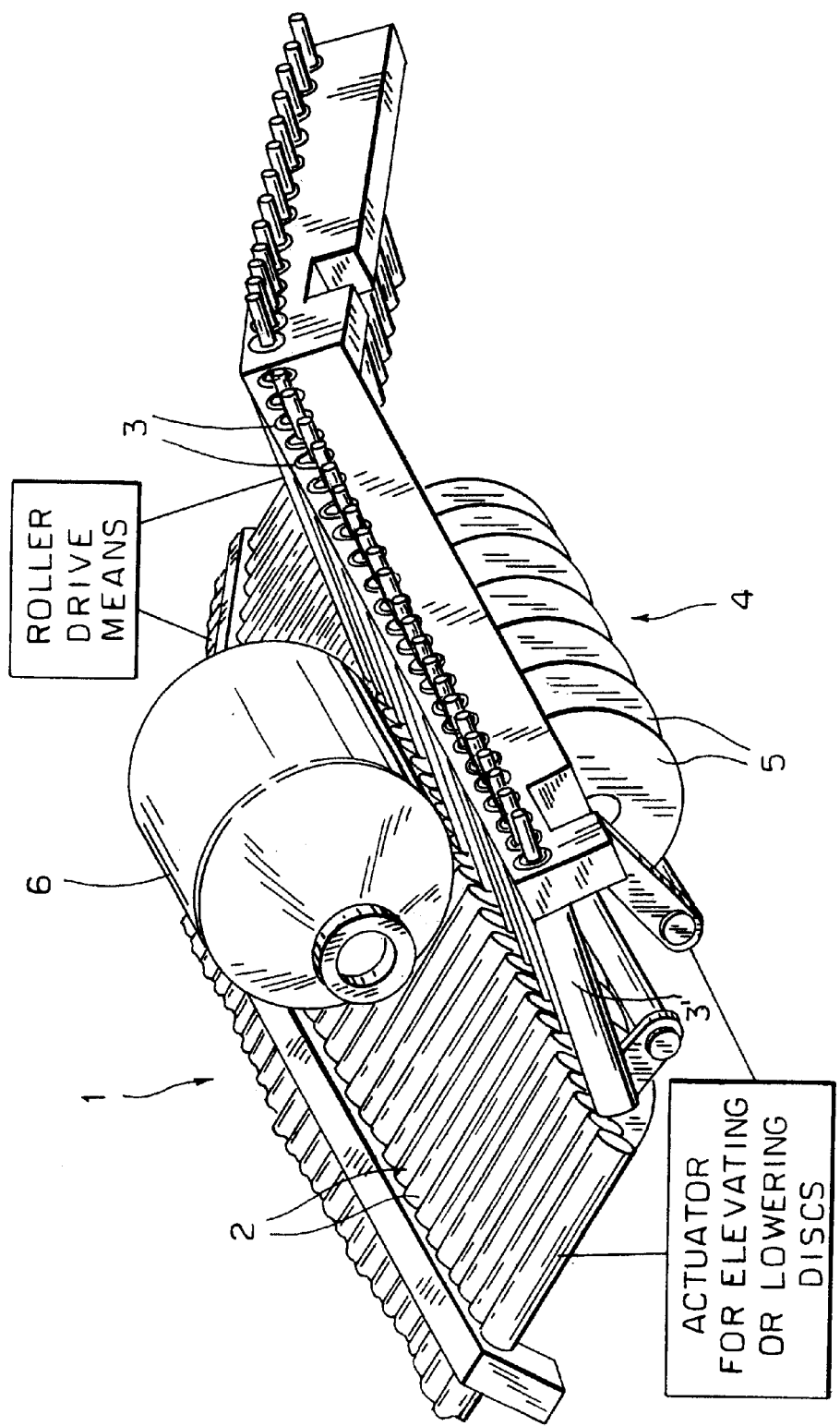
Figure 3:
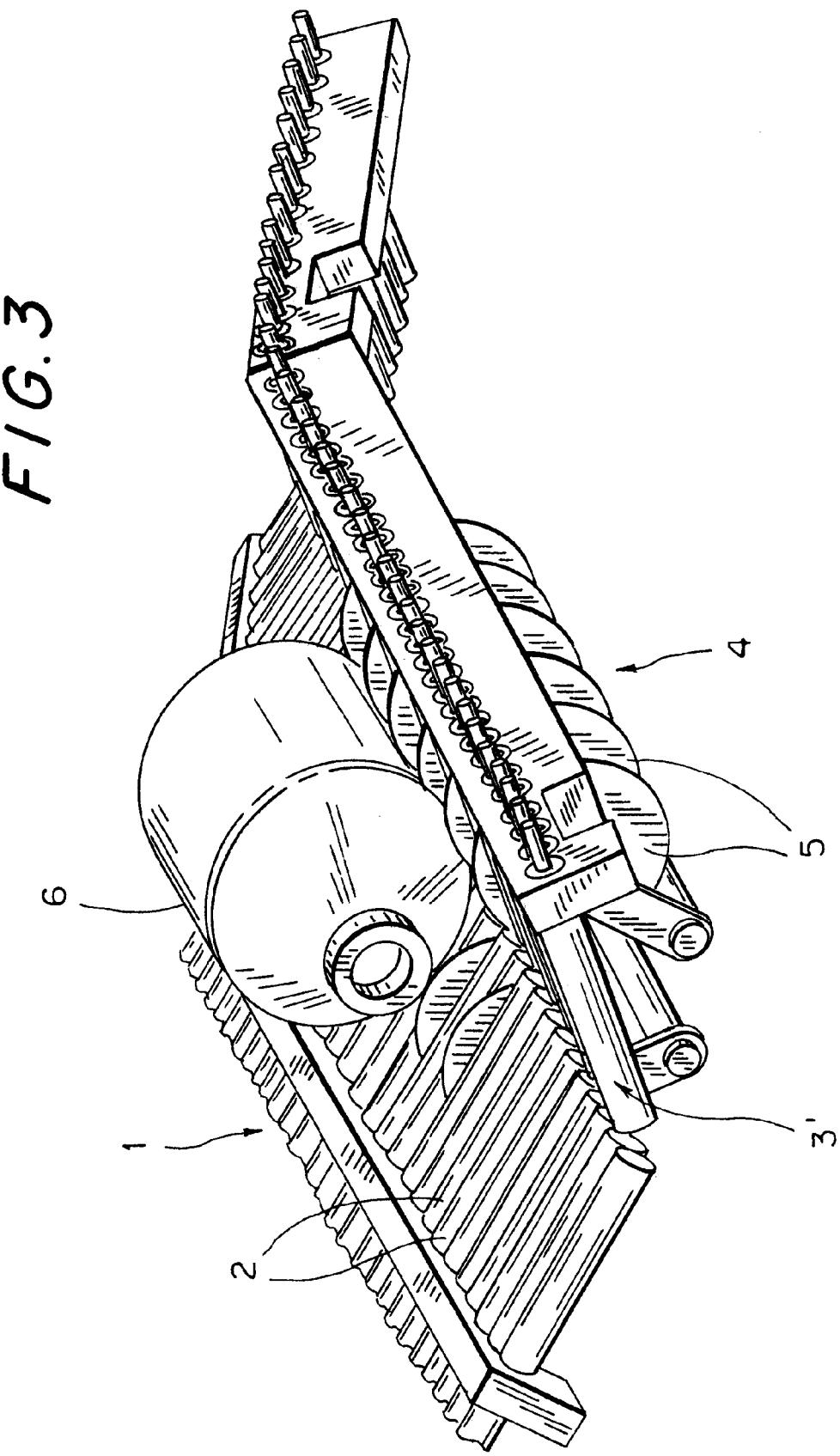
Figure 4:
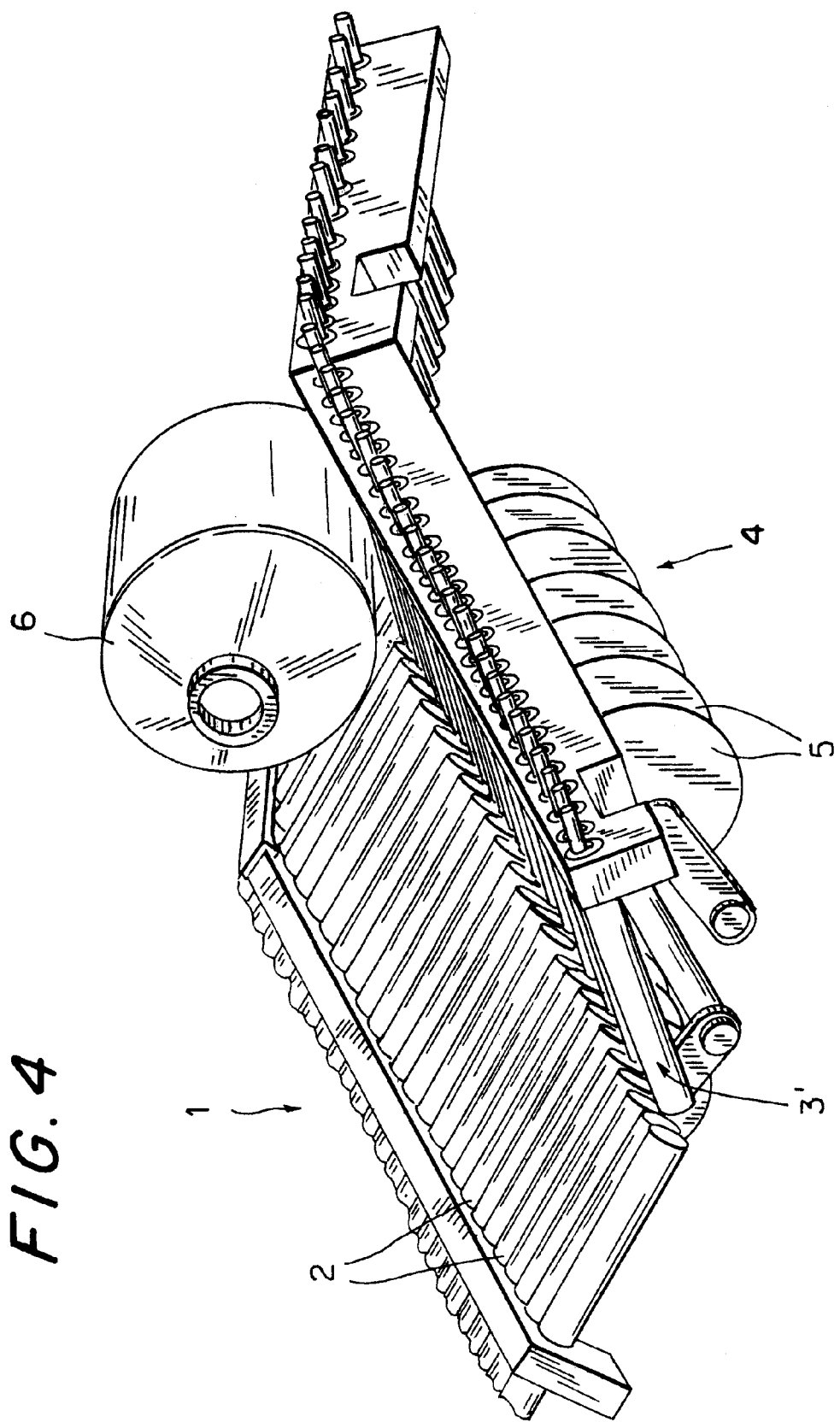

Accordingly, the function of the device is as follows: in FIG. 1 the returnable container which in the illustrated case is a bottle 6 is inserted by the person returning the bottle into the container intake device 1, more specifically onto the half-conveyors 2', 3'. (It must be noted that the diagram is simplified by omitting the housing of the automated redemption machine and other elements nonessential to the understanding of the invention.) As can be seen, the bottle 6 assumes in the intake device a position in which its sides rest against either one of the half-conveyors. The intake transport elements 2, 3 are driven by their actuator so that the bottle 6 travels downstream in the intake device until reaching a position above the rotating assemblies 4 as shown in FIG. 2. Subsequently, the transport elements of the intake conveyor are stopped and the actuator controlling the height position of the rotator discs is driven until the rotator assemblies reach their upper limit position. Then, the bottle 6 remains resting on the discs 5 of the rotating assemblies as shown in FIG. 3. In this position, the rotating discs 5 of the rotator assemblies are rotated by their drive motor in order to, e.g., read the bar code printed on the bottle 6 with the help of a bar code reader (not shown). After the required identification step is completed, the rotator assemblies 4 are lowered into their lower limit position, thus allowing the bottle 6 to sink again back onto the intake transport elements. Subsequently, the intake conveyor system is started again and the bottle 6 is either returned with the help of the conveyor means upstream back to the person attempting to redeem the bottle (should it happen that the automated machine cannot identify the object to be returnable) or the bottle is transported downstream to further processing steps (FIG. 4).

To those skilled in the art, it is obvious that the invention is not limited to the above-described exemplifying embodiments, but rather, may be modified within the scope of the appended claims. For instance, the rotator assemblies 4, 5 may obviously be rotated using only one drive motor instead of two as described above.

What is claimed is:

1. Intake device (1) of an automated redemption machine for returnable containers (6), said intake device comprising conveyor means (2', 3') for transporting the container in an essentially horizontal position and means (4, 5) for rotating the container for scanning a bar code, wherein the conveyor means (2', 3') have slots transverse to a travel direction of the conveyor means, said slots permitting at least partially elevating and lowering said means (5) via said slots for rotating the returned containers (6), wherein the conveyor means comprises a plural succession of intake transport elements (2, 3) aligned essentially transverse to the travel direction of the conveyor means, wherein said transverse slots are gaps between said transport elements.

2. Intake device according to claim 1, wherein said intake transport elements (2, 3) are arranged to comprise two adjacent half-conveyors (2', 3') with essentially planar surfaces tilted in respect to each other so as to form an essentially V-shaped conveyor on which a container (6) being transported is supported by both of the half-conveyors (2', 3').

3. Intake device according to claim 2, wherein said intake elements are transport rollers (2, 3) rotated by a common or separate drive means, whereby the half-conveyors have successive roller sets.

4. Intake device according to claim 3, wherein at least one section of the roller sets are rotatable independently from other sections of the roller sets.

5. Intake device according to claim 2, wherein the means for rotating the container comprise rotator assemblies (4) beneath both of the half-conveyors, at least over a portion of the conveyor means travel, and that both of the rotator assemblies comprise a plurality of axially aligned rotating discs (5) having a principal plane thereof aligned parallel to a longitudinal axis of the intake transport elements (2, 3), said discs being arranged to coincide with the traverse slots, and that said rotator assemblies (4) are equipped with an actuator for elevating and lowering said rotating discs in said traverse slots respectively up and down.

* * * * *